United States Patent
Gerwens et al.

(10) Patent No.: US 12,405,951 B2
(45) Date of Patent: Sep. 2, 2025

(54) CUSTOM REPLACEMENT OF FUNCTIONS WITH INVERSE FUNCTIONS FOR IMPROVED QUERY PERFORMANCE

(71) Applicant: SAP SE, Walldorf (DE)

(72) Inventors: Heiko Gerwens, Heidelberg (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 175 days.

(21) Appl. No.: 18/211,185

(22) Filed: Jun. 16, 2023

(65) Prior Publication Data

US 2024/0419664 A1    Dec. 19, 2024

(51) Int. Cl.
   *G06F 16/21*   (2019.01)
   *G06F 16/2453*   (2019.01)

(52) U.S. Cl.
   CPC ...... *G06F 16/24542* (2019.01); *G06F 16/217* (2019.01)

(58) Field of Classification Search
   None
   See application file for complete search history.

(56) References Cited

U.S. PATENT DOCUMENTS

| | | | |
|---|---|---|---|
| 12,072,887 B1* | 8/2024 | Schieferstein | .... G06F 16/24553 |
| 2013/0297586 A1 | 11/2013 | Singh et al. | |
| 2014/0380051 A1 | 12/2014 | Branish, II et al. | |
| 2016/0292016 A1* | 10/2016 | Bussard | .......... G06F 16/24568 |

OTHER PUBLICATIONS

European Search Report received in European Application No. 24181978.8, dated Oct. 15, 2024, 8 pages.

* cited by examiner

*Primary Examiner* — Scott A. Waldron
(74) *Attorney, Agent, or Firm* — Klarquist Sparkman, LLP

(57) ABSTRACT

Techniques and solutions are provided for improving query performance using inverse functions. Often a function is used to perform operations such as data type conversions. The use of these functions can be resource intensive, such as if a conversion needs to be performed for all rows of a particular relational database table. The present disclosure allows for the registration of inverse functions that can be used, or at least be considered for use, in place of a function. A given inverse function can be associated with its function using techniques such as maintaining mapping information or using a particular naming convention. A particular syntax is provided for designating and creating an inverse function.

20 Claims, 9 Drawing Sheets

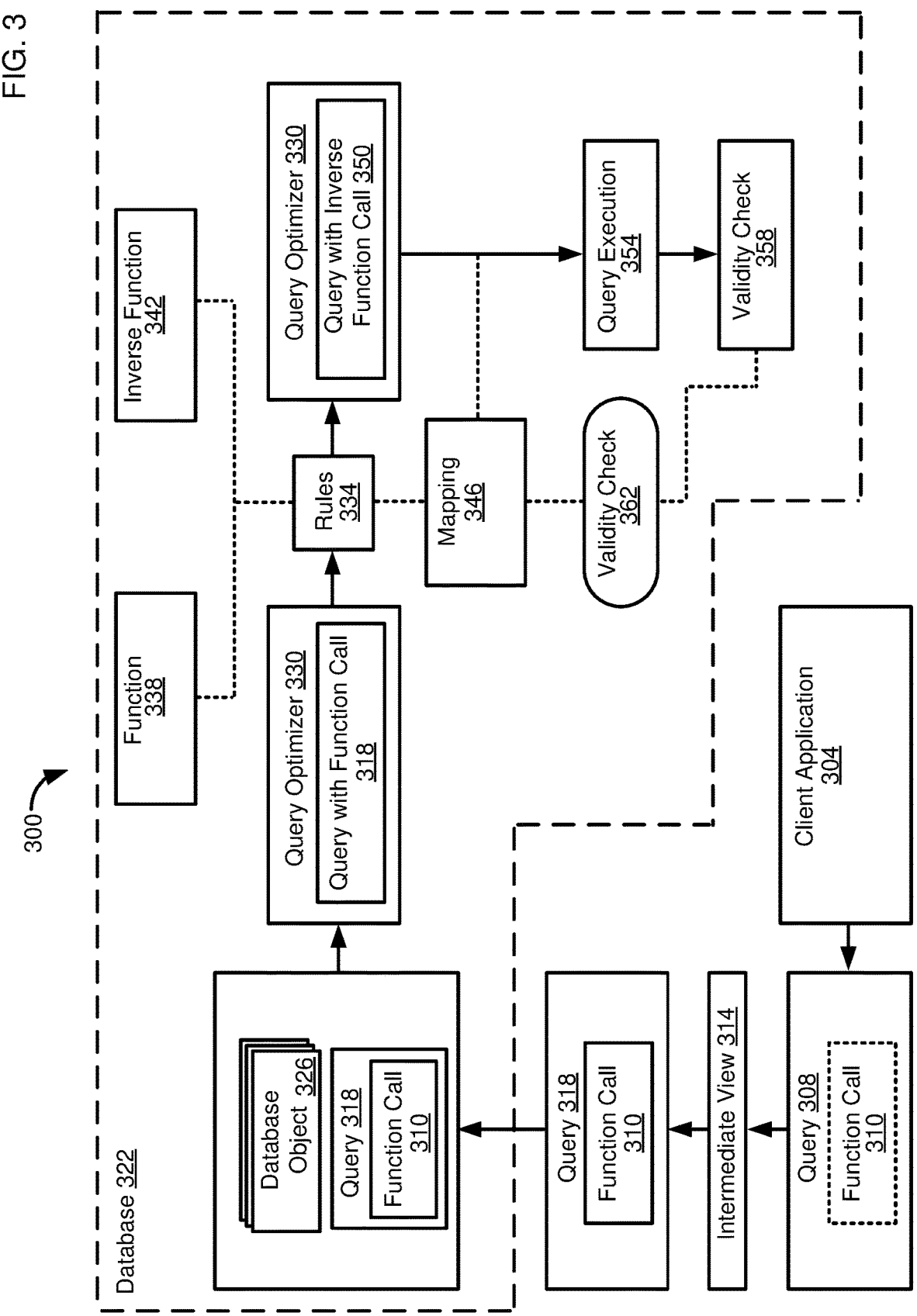

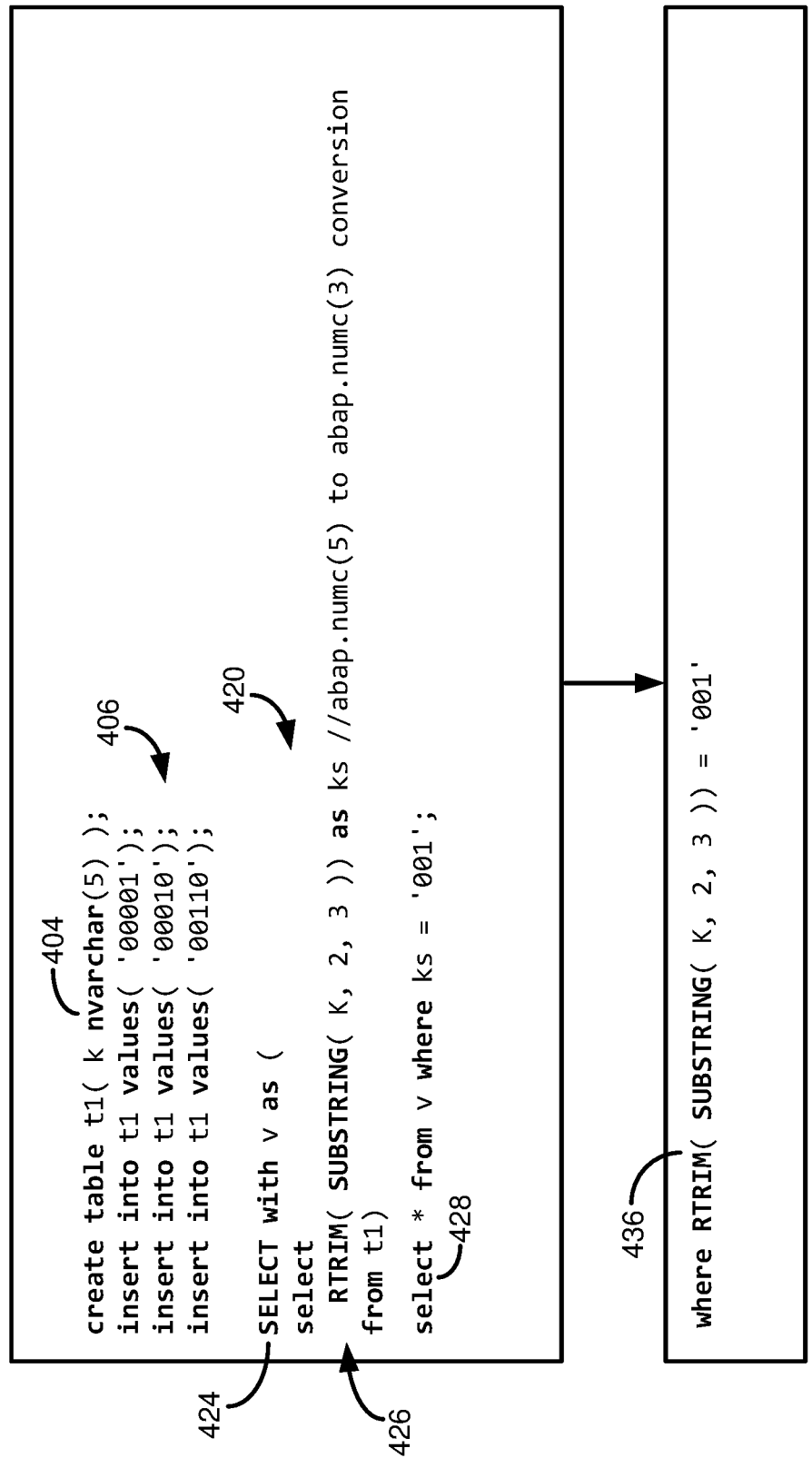

```
CREATE OR REPLACE FUNCTION CONVERT_NUMC (val nvarchar(5))            500
RETURNS converted_NUMC nvarchar(3) LANGUAGE SQLSCRIPT AS
BEGIN
    converted_NUMC := RTRIM( SUBSTRING( val, 2, 3 ));      504
END;
select * from t1 where CONVERT_NUMC(k) = '001';
                         508
```

FIG. 5A

```
                                                                         530
CREATE OR REPLACE INVERSE FUNCTION CONVERT_NUMC_INVERSED FOR CONVERT_NUMC (val nvarchar(3))
RETURNS inverted_NUMC nvarchar(5) LANGUAGE SQLSCRIPT AS
BEGIN
    inverted_NUMC := concat('00', val);
                         536
END;
                    542
select * from t1 where CONVERT_NUMC(k) = '001';
                                                        570
select * from t1 where k = CONVERT_NUMC_INVERSED('001');
                              560
```

FIG. 5B

CUSTOM REPLACEMENT OF FUNCTIONS WITH INVERSE FUNCTIONS FOR IMPROVED QUERY PERFORMANCE

FIELD

The present disclosure generally relates to improving query execution for queries involving functions. Particular implementations relate to rewriting queries as part of query optimization to use an inverse function in place of a function specified in the query, where the inverse function is registered in the system, such as by a user.

BACKGROUND

Many software applications, particularly enterprise level software applications, interact with data in a datastore, such as in a relational database system. It is not uncommon for data to be stored in different formats. For example, data objects used by a software application may store a particular type of data in one data type, while physical data objects used by the relational database may store that particular type of data in a different data type. As a simple example, consider numerical data that can be represented as a three-digit number by the software application, but where the data is stored as a five-digit number in a physical database object. Conversions may be needed to interconvert between the data type used by the application and the data type used by the database. These conversion operations can be computationally expensive, including because they may need to be performed on a row-by-row basis for result sets containing a substantial number of records (such as thousands, or even millions of rows). Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for improving query performance using inverse functions. Often a function is used to perform operations such as data type conversions. The use of these functions can be resource intensive, such as if a conversion needs to be performed for all rows of a particular relational database table. The present disclosure allows for the registration of inverse functions that can be used, or at least be considered for use, in place of a function. A given inverse function can be associated with its function using techniques such as maintaining mapping information or using a particular naming convention. A particular syntax is provided for designating and creating an inverse function.

In one aspect, the present disclosure provides a process of optimizing a query that includes replacing a function with an inverse function. As will be described, in at least some cases, the use of an inverse function can provide improved query performance compared with using the function. A function definition of a function is received. An inverse function definition of an inverse function is received from a client, where the inverse function is an inverse function of the function. A query is received, where the query includes a call for the function. It is determined that the inverse function is available for the function. A query execution plan is prepared that includes the inverse function in place of the function.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 illustrates a process for rewriting a query from a client application, that calls a function, to use an inverse function to provide improved query performance.

FIG. 4 illustrates how a query that includes a function, or a function call, can be computationally expensive to execute.

FIGS. 5A and 5B indicate how the functionality of the query of FIG. 4 can be written to use an inverse function to provide improved query performance, including illustrating how an inverse function can be associated with a particular function.

DETAILED DESCRIPTION

Example 1—Overview

Figure 1:
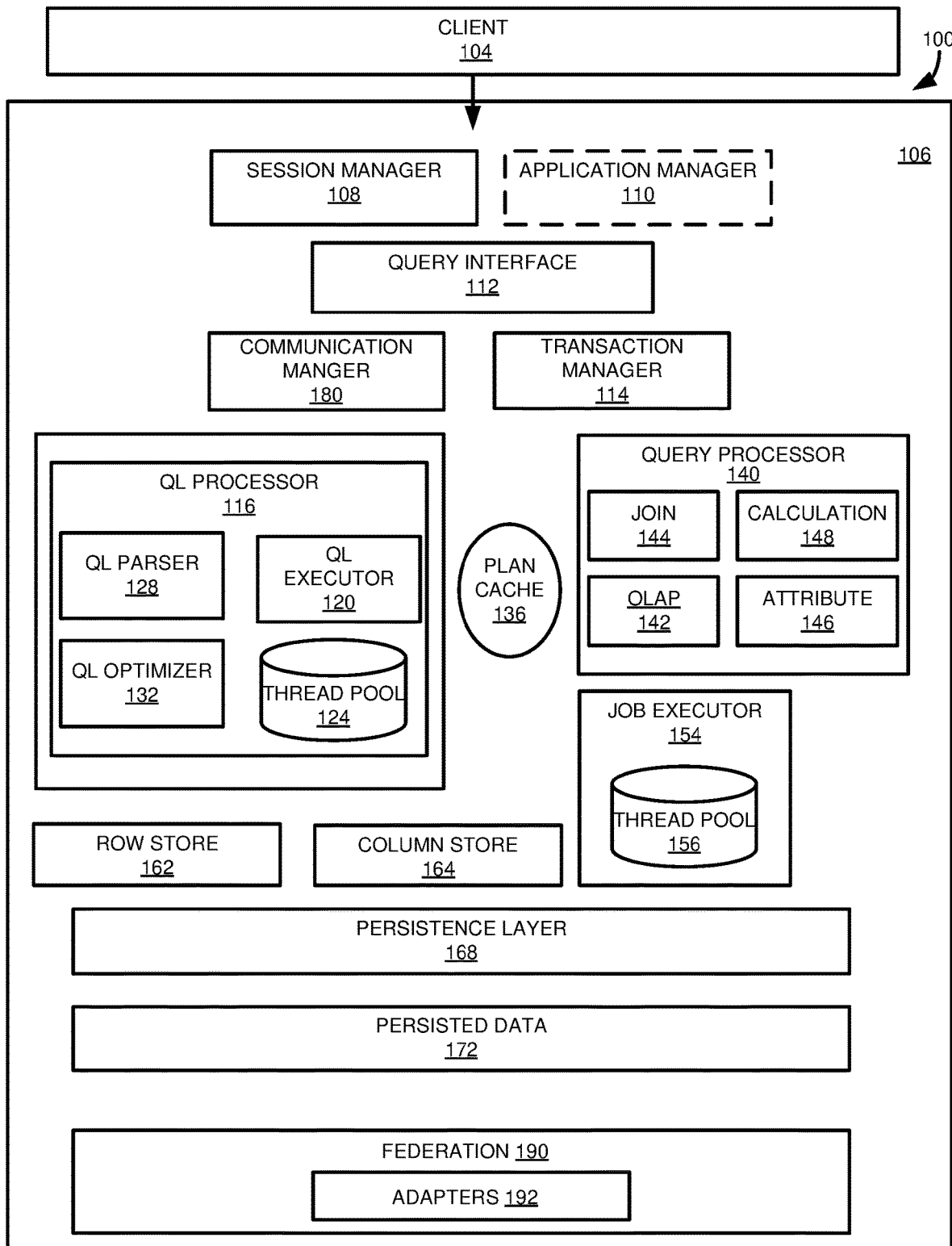
FIG. 1 is a diagram depicting an example database system that can be used in implementing aspects of disclosed technologies.

Many software applications, particularly enterprise level software applications, interact with data in a datastore, such as in a relational database system. It is not uncommon for data to be stored in different formats. For example, data objects used by a software application may store a particular type of data in one data type, while physical data objects used by the relational database may store that particular type of data in a different data type. As a simple example, consider numerical data that can be represented as a three-digit number by the software application, but where the data is stored as a five-digit number in a physical database object. Conversions may be needed to interconvert between the data type used by the application and the data type used by the database. These conversion operations can be computationally expensive, including because they may need to be performed on a row-by-row basis for result sets containing a substantial number of records (such as thousands, or even millions of rows).

As additional examples of issues that can result when data type conversions of table data are performed, the conversions can cause indexes not to be useable with database operations for the table. That is, the indexes are typically generated based on the values natively stored in a row (or, more accurately, row values for a particular column or set of columns are used to generate the index). So, if evaluation of a converted value is needed, each row of the table may need to be converted and evaluated, rather than a more efficient process that uses the index. These problems can cause JOIN operations to perform more slowly.

Moreover, as discussed above, apart from not being able to use the index, comparisons during a JOIN can require conversion of an attribute value for each row of the table, which adds computational cost to what is typically already a resource intensive process. Further, query optimizers often use factors such as the availability of indexes, joins, and table sizes to make cost estimations. However, conversions can affect the performance of the operations, and so it may be more difficult for the query optimizer to make accurate estimations and choose efficient plans. Accordingly, room for improvement exists.

As a particular example, consider a query that is defined to retrieve values where records match a certain condition expressed as a three-digit value, where a database object stores the information as five-digit values. Assume that truncating the five-digit values to three-digit values does not change the meaning of the information—such as if the five-digit value simply pads the three-digit values with leading zeros.

In this case, there are at least two options for evaluating the condition. In one way, a function can be used to convert the five-digit stored values to three-digit values to match the format of the condition, allowing the condition to be evaluated. However, this conversion may need to be executed for each row against which the condition is being evaluated.

As another option, the three-digit condition value can be converted to a five-digit value, allowing the condition value to be compared directly with the row values. So, rather than performing a conversion operation for each row, a single conversion for the condition is performed and then used for evaluating all rows.

Typically, functions are defined that operate on the data as stored. That is, normally a function would convert the stored data to the format used for the condition. This approach is often selected because it is not known whether an inverse function, converting the condition from a three-digit value to a five-digit value, will change the meaning of the information. In some database systems, inverse functions can be used for particular data types when there is no, or very little, chance for data to be altered as part of a conversion. For example, because of the nature of Unicode encoding, database systems of SAP SE, of Walldorf, Germany, can use inverse functions for converting data in a "longdate" data type to an "nvchar" data type. However, such conversions are typically "hardcoded," such as in rules applied by a query optimizer, and, as discussed, are available for a very limited set of conversions.

The present disclosure provides innovations that allow for more general use of inverse functions. In particular, a user or client, such as a software developer, can determine whether an inverse function is available that will not change the "meaning" of data, or at least beyond an acceptable degree. For example, a developer can determine that padding "nvchar(3)" format data with leading zeros to provide data in an "nvchar(5)" format will not change the meaning of the data, or that truncating values in an "nvchar(5)" format to an "nvchar(3)" format will not result in data loss.

Thus, a user can define or specify a particular inverse function to be used with a given (non-inverse) function. A query optimizer, during query compilation, can recognize that the function has a specified inverse function, and can replace the function with the inverse function in a query plan, or at least can consider replacing the function even if the use of the inverse function is eventually rejected/not selected.

Disclosed techniques can greatly improve query execution by using more easily processed inverse functions. The use of the inverse function can allow for the use of existing indexes, can expedite JOIN and selection operations by allowing for direct value comparisons, and can facilitate the operation of a query optimizer by allowing more accurate cost estimates to be made, and providing the query optimizer with more flexibility in rewriting a query or otherwise optimizing query operations. In addition, application developers are able to more flexibly accept input in different formats, such as when a particular type of input "makes more sense" from the point of view of an end user, and still obtain good query performance. The use of inverse functions can also facilitate interoperability of computing processes, since it may be desirable to use a common format for values that will be evaluated by a function, but instead use an inverse function for actual query execution.

Example 2 describes a general relational database environment in which disclosed techniques can be implemented. Example 3 describes how a software application can access data from a data source using an intermediate software layer, such as a layer that includes a virtual data model that is mapped to one or more physical data models of one or more data sources that hold the relevant data.

Example 4 describes how function calls issued by a client application can be analyzed by a query optimizer and, at least in some cases, be replaced with an inverse function. Example 5 provides particular example of functions and associated inverse functions, as well as example commands that can be used to create inverse functions that can be recognized and accessed by a query optimizer. Example 6 describes an example query optimization process using disclosed techniques.

Example 2—Example Database Architecture

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

For the purposes of the present disclosure, one task that can be performed by the query language optimizer 132 is determining whether a function used in the query is associated with an inverse function. If so, the query language optimizer 132 can rewrite the query to use the inverse function, optionally after determining that the inverse function results in a lower overall execution cost.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and sub-query), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server may hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a remote data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at a remote system. In carrying out its functions, the data federation component 190 can include one or more adapters 192, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Figure 2:
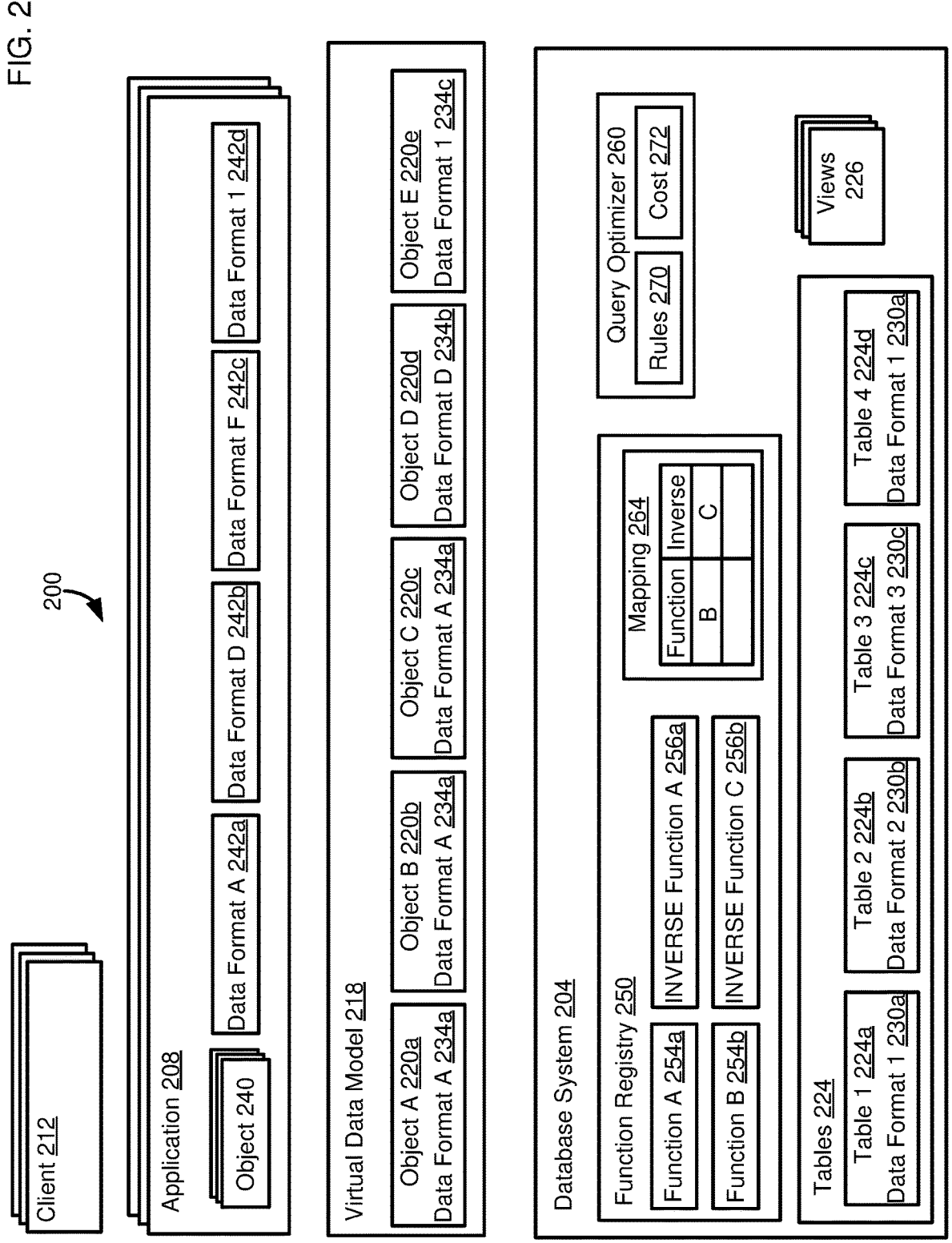
FIG. 2 is a diagram depicting a computing environment illustrating how applications, virtual data model objects, and database objects can interact, including where data used by the applications, virtual data model objects, and database objects can be in different data formats.

Example 3—Example Computing Environment Illustrating Relationships Between Applications, Virtual Data Models, and a Database System, Including the Use of Different Data Formats Therewith FIG. 2 illustrates an example computing environment 200 in which disclosed techniques can be implemented. The computing environment 200 includes a database system 204, one or more applications 208, and one or more application clients 212. The one or more application clients 212 can interact with the one or more applications 208 to perform create, read, update, or delete (CRUD) operations with respect to data stored in the database system 204.

In some cases, an application 208 can interact with objects 220 (shown as objects 220a-220e) in a virtual data model 218, where those objects can interact with tables 224 (shown as tables 224a-224d) or views 226, where the views can be materialized views (where data from view sources at a particular time when the view was created or last updated is persisted) or views where data is dynamically accessed from sources referenced by the view during execution of database operations. Unless otherwise explicitly specified, or clear from the surrounding discussion, the term "query," as used herein, can include insert, deletion, and update operations, in addition to read operations.

Turning to the tables 224 of the database system 204, tables 224a-224d are shown with different data formats 230 (shown as data formats 230a-230c). The data formats 230a-230c can represent data formats, such as data types, used with one or more attributes (which can also be referred to as fields or columns) of a given table 224. In practice, tables 224 typically include multiple attributes, and those multiple attributes often include several different data types, including data types that vary from one another by properties such as length, size, or precision. A single format is shown for each table 224 for simplicity of presentation. Different database tables 224 can differ completely or partially in the data types used for the attributes, or they can have the same data types.

The objects 220 of the virtual data model 218 are also shown as having different data formats 234 (shown as data formats 234a-234c). As discussed for the tables 224, in practice, the objects 220 will have multiple attributes, where the attributes in an object can have the same or different data types, and where attributes in different objects can have the same or different data types. It can be seen that objects 220a, 220b, 220c all have a common format 234a, where the data format 234a is not shown as being a data format 230. Object 220d has a data format 234b that is different than the data formats 234a, 234b, and is also different than the data formats 230. Object 220e has a data format 234c that corresponds to the data format 230a of the table 224a.

An application 208 can include a plurality of objects 240. The objects 240 can be, for example, class definitions (or definitions of other abstract or complex data types), and an application can use instances of the objects during application execution. The application 208 employs one or more data formats 242 (shown as data formats 242a-242d). The data formats 242 can correspond to data formats 230, 234, or can be different than those data formats. In particular, data format 242a corresponds to the data format 234a, while the data format 242c corresponds to the data format 230a. The data format 242b differs from the data format 234 of the virtual data model 218 and of the data formats 230 of the database 204, and so conversion would be needed for the data to be stored in the tables 224, including if the data were also associated with an object 220 of the virtual data model.

In general, "data format" refers to a particular data type, or a particular implementation of a data type (such as nvchar(3) and nvchar(4)). Data formats can refer to "built in" data formats, such as data types that are provided by a particular programming language, or through the inclusion of various library objects of a programming language. Even within "built in" data types, the data types can be of different classifications, such as having primitive data types such as "int" or "float," or having non-primitive data types, such as strings and arrays. "Data format" can also referred to user-defined data types, such as abstract or composite data types.

As discussed in Example 1, disclosed techniques relate to converting data between data formats, particularly when the conversion includes at least one table 224. That is, in the example computing environment 200, the application 208 can have some data formats 242 that are the same as the data formats 230 of the database 204, in which case conversion may not be required in order to have the database perform operations using data received from, or requested by, the application. However, the application 208 can have other data formats 242 that do not correspond to data formats 230 of the database system 204. In at least some cases, it may be possible to convert from a data format 242 to a data format 230. Some conversions may be inherently "lossless," while other conversions may involve the loss of information, but the loss of information may not be significant to the operation of an application 208.

As also discussed in Example 1, there can be a variety of reasons why the application 208, the virtual data model 218, and the database system 204 use different data formats, even as to data having the same semantic meaning. For example, data representing a date could be maintained as a string ("May 23, 2024") or could be represented in a numerical data type (05232024) or a data type specifically defined to store "date" information. In some situations, it may be preferable for the application 208 to accept and present data in a particular format, such as when it is easier for a user to understand a date presented as a string instead of being presented as a number or a value in a data type. However, it may be more efficient to store or process the date information in another format.

FIG. 2 illustrates another example of why it may be beneficial to use different data types for tables 214 and objects 220 of the virtual data model 212. That is, since objects 220a-220c use the same data format 234a, which is also used by the application 208 as data format 242, it may be easier for the application and virtual data models to function by using this common data format, rather than using a data format 230 of the database system 204, even if the data associated with the application/objects has the same semantic meaning as data stored in the database system.

As will be further described, data conversion functions can be implemented, such as functions 254 (shown as functions 254a, 254b) in a function registry 250 of the database system 204. The database system 204 can include functionality for associating such functions 254 with corresponding inverse functions 256 (shown as inverse functions 256a, 256b). This association can be accomplished in a number of ways. In one way, a naming convention can be implemented such that software logic, such as logic associated with a query optimizer 260, can search for an inverse function 256 given a name or other identifier for a function 254. As shown, inverse function 256a has the same name as the function 254a, but including the term "inverse." Thus, in this implementation, programmatic logic can check for the existence of an inverse function 256 by adding "inverse" to the name of a given function 254.

In another example, the database system 204 can store mapping information 264. The mapping information 264 is shown as a table, having a function column and an inverse function column. The function 254b and inverse function 256b are shown as being a record of the table. Thus, when a function is specified, programmatic logic can check the mapping information 264 to determine whether an inverse function 256 has been specified for a given function 254.

In operation, the query optimizer 260 can used rule-based logic 270 or cost-based logic 272 to determine whether an inverse function 256 is available for a given function 254, and in some cases whether to use the inverse function. That is, in one approach, the rule-based logic 270 always uses an inverse function 256 in place of a function 254 when an inverse function is available. In another approach, the cost-based logic 272 can consider use of the function 254 or the inverse function 256, and select between them based on which provides a query plan with an overall lower cost.

Example 4—Example Query Rewriting to Use Inverse Function in Place of Function

FIG. 3 illustrates an example process 300 using disclosed innovations. In the process 300, a client application 304 issues a query 308. In one implementation, the query includes a function call 310. The function call 310 can be to a function that performs a data type conversion, and can correspond to a function 254 of FIG. 2.

Optionally, the query 308 can be to an intermediate view 314, such as a view of a virtual data model. In one example, the intermediate view 314 receives the function call 310 from the query 308 and includes the function call in a query 318 from the intermediate view to a database system 322. In another example, the query 308 does not include the function call 310, and instead the function call is introduced in the query 318 generated by the intermediate view 314.

The query 318 can be processed at a database system 322 to perform operations on one or more database objects 326, such as table or views. When the query 318 is received by the database 322, it can be processed by a query optimizer 330. The query optimizer 330 prepares a query plan for executing the query 318. In preparing the query plan, the query optimizer 330 can apply rules 334. The rules 334 can consider whether an inverse function 342 has been specified for a function 338 called by the function call 310 of the query 318. In some cases, the rules can consider naming conventions to determine whether the function 338 has an inverse function 342. In other cases, the availability of an inverse function 342 can be determined from mapping information 346.

If the query optimizer 330 determines either from a rule-based approach or a cost-based approach that the inverse function 342 should be used in place of the function 338, the query optimizer 330 can prepare a query plan for a rewritten version 350 of the query 318 that uses the inverse function instead of the function. Optionally, the query 350 can be executed at 354, and execution results returned to the client application 304.

It may be desirable to determine whether use of the inverse function 342 provides identical or equivalent results to execution of the query 318 using the function 338. Accordingly, a validity check can be performed at 358. Validity checks 362 can be defined for particular inverse functions 342, and can be associated with an inverse function via the mapping information 346. Alternatively, the appropriate validity check 362 for an inverse function 342 can be determined in another way, such as using naming conventions. In further cases, the validity check process of 358 can use built in equality operators defined for the database system 322.

Example 5—Example Function and Corresponding Inverse Function, and Technique for Associating Inverse Function with Function FIGS. 4, 5A, and 5B illustrate a particular example of how disclosed techniques can improve query performance by replacing functions with specified inverse functions. Code 404 creates a table "t1" having a single column for an attribute 'k', having a nvchar(5) data type. Code lines 406 insert nvchar(5) values into this table. The table t1, populated with the values, can represent data as stored by a database system.

Now assume a query 420 for the table t1 is received. In the query 420, line 424 defines a temporary view "v" that takes data selected from the table t1 created by code 404 using a SELECT clause in lines 426. The "SELECT" clause in lines 426 includes a function "SUBSTRING" that takes a value "K," and extracts a string starting from the second character (based on the value of "2") and being three characters in length (based on the value of "3"). Assuming an example string of "ABCDE," the SUBSTRING function would return BCD. The RTRIM function removes any whitespaces from the resulting substring, designated as "ks" within the temporary view "v." The "SELECT" clause at line 428 extracts values from the temporary view "v" that are equal to the condition "001."

For the query 420, a query optimizer would typically produce the filter condition 436 for evaluation by a database execution engine. It can be seen that the filter condition 436 performs a substring operation for every value of "k." The substring operations involve additional computation complexity, as compared with simple value comparisons, particularly when a large number of values are being processed (which can be thousands or even millions of rows for enterprise level software applications).

FIG. 5A illustrates the creation of a function 500, CONVERT_NUMC, that converts a 5-character nvchar input to a 3-character nvchar output. The body 504 of the function creates a string, converted_NUMC, that corresponds to the SUBSTRING function of the query 420. A query 508 illustrates how the function 500 can be used in a selection operation as a filter condition. As discussed, the function 500 can suffer from degraded performance, particularly when large number of records are to be processed.

FIG. 5B illustrates the creation of an inverse function 530 that corresponds to the function 500. In this case, the function 530 returns a value for a variable inverted_NUMC as a 5-character nvchar value. A body 536 of the function 530 accomplishes the conversion by concatenating two leading zeros with the provided input. The line 542 that creates the inverse function 530 includes the keyword "INVERSE" and incudes the "FOR" keyword that is followed by an identifier of a non-inversed function to which the function 530 is mapped, such as the function 500.

FIG. 5B also illustrates how a query optimizer can use inverse functions during query optimization. Assume a query 560 is received, which corresponds to the query 508. However, in this case, the query optimizer, such as using a mapping created using the "FOR" keyword, or based on namespace conventions (where CONVERT_NUMC_INVERSED would be held to correspond to CONVERT_NUMC, since the only difference in the function names is the addition of "INVERSED" in the inverse function name).

Based on rules, or on cost considerations, the query optimizer can rewrite the query 560 as query 570, using the inversed function. According to the function 530, two leading zeros would be added to the input of "001" to provide output of "00001." The output is now in nvchar(5) format, and so can be directly compared with values stored in the database. Thus, it can be seen that disclosed techniques can allow database queries to be performed with fewer conversion operations. More generally, inverse functions can be defined to improve query performance, even if not through reducing a number of conversion operations. That is, for example, an inverse function may be useful even if it does not change a number of conversion operations, such as if an inverse function has a more efficient conversion process than a conversion process using a non-inverse function.

As discussed in Example 4, additional operations can be performed, such as confirming that use of the inverse function 530 provides results corresponding to those of the function 500. Expressed mathematically, this confirmation can include determining, for a value "X," that f'(f(X))=X, where f is the non-inverse function and f' is the inverse function. In a particular example, the verification can be performed based on a command to execute a query (or to generate a query execution plan for later execution. Example query execution/plan compilation requests can be "SELECT [ . . . ] FUNCTION CALL <VERIFY>[ . . . ]" or "PREPARE SELECT [ . . . ] FUNCTION CALL <VERIFY>[ . . . ]", where "[ . . . ]" indicates addition query commands.

Note that in some cases an "inverse function" can be a "strict" inverse function, in that the function and inverse function have the relationship above using a strict equality operator. In other cases, an "inverse function" can be a "loose" inverse function, where the relationship is satisfied using some other equality operator or test, such as a custom test defined based on a particular use scenario for data to be processed by a query that uses the function/inverse function.

Example 6—Example Query Optimization

Figure 6:
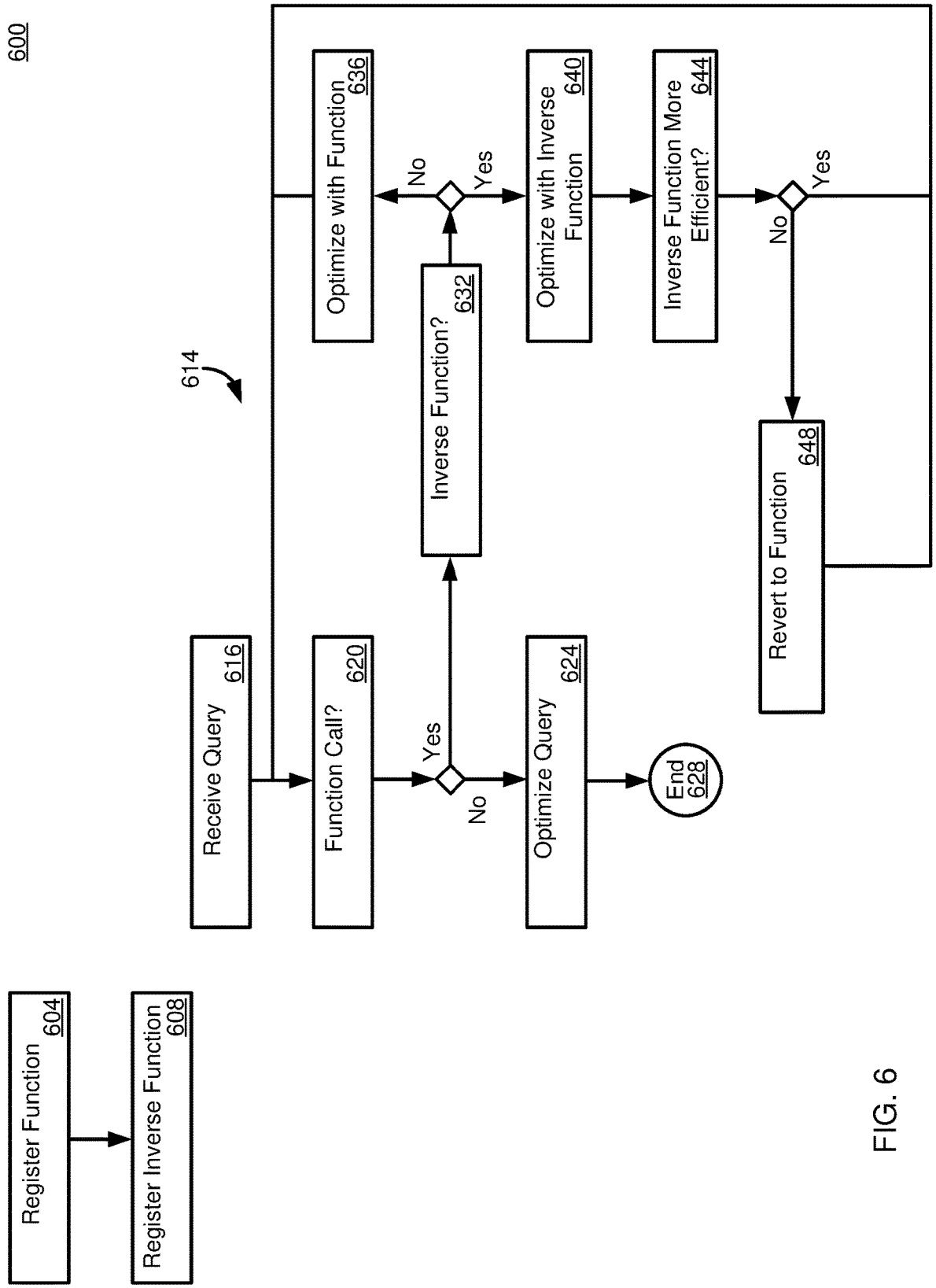
FIG. 6 is a flowchart of an example query optimization process using disclosed techniques.

FIG. 6 is flowchart of a process 600 of defining functions and inverse functions, and using inverse functions during query optimization. At 604, a request to register a function is received. As part of 604, the function can be registered in a registry and can be accessed during query optimization and execution. A request to register an inverse function is received at 608, where the inverse function can also be registered in the registry. In at least some cases, the operations at 608 can include store information mapping the function to the inverse function.

A query is received at 616, and an optimization process 614 is initiated. At 620, the optimization process 614 determines whether the query includes a function call. If the query does not include a function call, optimization of an execution plan for the query can be performed at 624, and the process 614 can end at 628.

If it is determined at 620 that the query includes a function call, it is determined at 632 whether an inverse function is associated with the function of the function call. For example, mapping information can be retrieved to determine whether an inverse function has been mapped to the function call, or naming conventions can be used to determine an expected identifier for an inverse function, and it can be determined whether an inverse function with that identifier is available.

If it is determined at 632 that an inverse function is not associated with the function of the function call, where the process 600 can proceed to optimize a portion of the query using the function. The process can then return to 620, to determine whether the query includes additional function calls.

If it is determined at 632 that an inverse function is associated with the function of the function all, the process can optimize the portion of the query using the inverse function. Optionally, it can be determined at 644 whether the query with the inverse function is more efficient than using the function. If not, the process 600 can reverse processing of the query to use of the function. After 644 or 648, or if 644 is omitted, the process 600 can return to 620 to determine whether the query includes additional function calls.

Example 7—Example Operations

Figure 7:
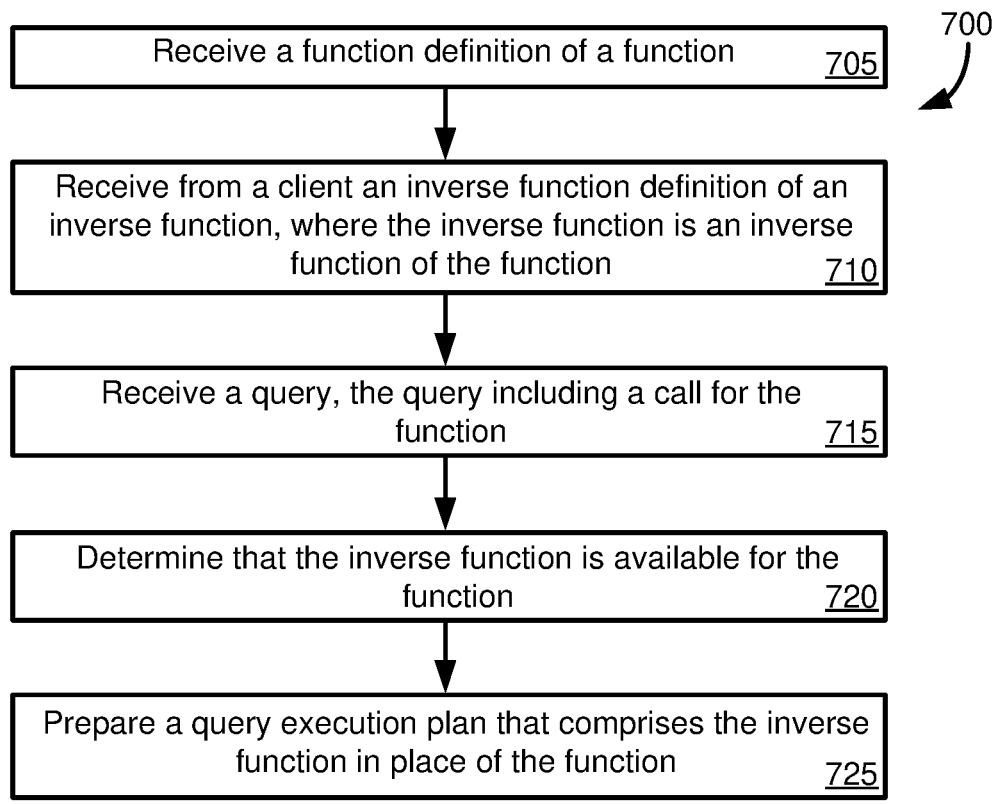
FIG. 7 is flowchart of optimizing a query that includes replacing a function with its corresponding inverse function.

FIG. 7 is a flowchart of a process 700 for optimizing a query that includes replacing a function with an inverse function. As described, in at least some cases, the use of an inverse function can provide improved query performance compared with using the function. A function definition of a function is received at 705. At 710, an inverse function definition of an inverse function is received from a client, where the inverse function is an inverse function of the function. A query is received at 715, where the query includes a call for the function. It is determined at 720 that the inverse function is available for the function. At 725, a query execution plan is prepared that includes the inverse function in place of the function.

Example 8—Computing Systems

Figure 8:
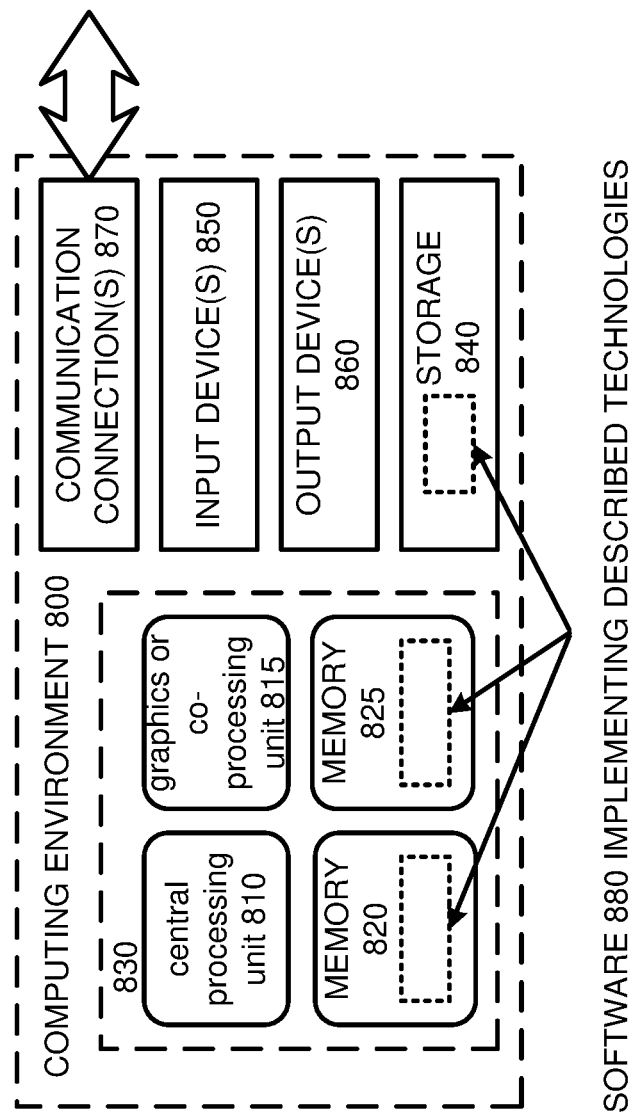
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing a database environment, and associated methods, described in Examples 1-7. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 9:
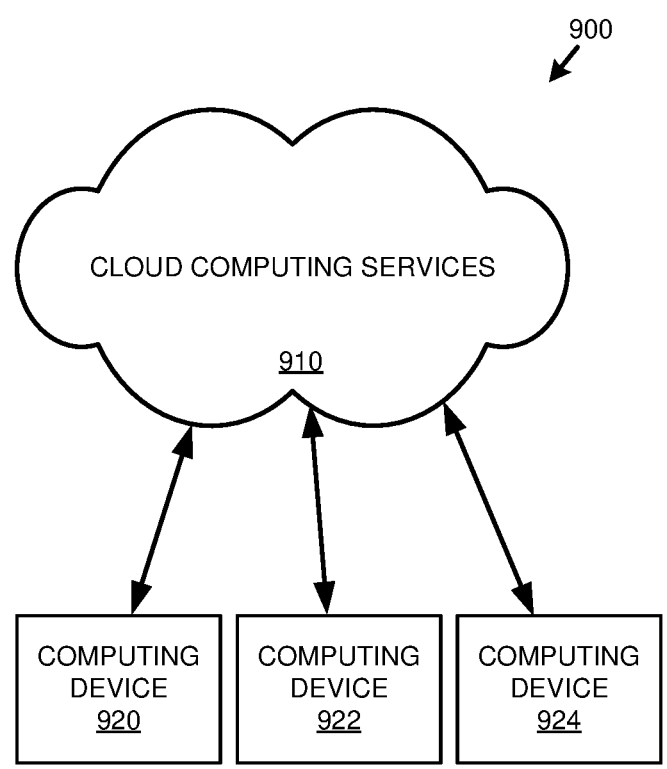
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processor units coupled to the at least one memory; and
   one or more computer readable storage media storing computer-executable instructions that, when executed, cause the computing system to perform operations comprising:
      receiving a function definition of a function;
      receiving from a client an inverse function definition of an inverse function, wherein the inverse function is an inverse function of the function;
      receiving a query, the query comprising a call for the function;
      determining that the inverse function is available for the function; and
      preparing a query execution plan that comprises the inverse function in place of the function, wherein preparing the query execution plan comprises a rewritten predicate in which the inverse function is applied to a value specified in the query; and
      executing the query execution plan, the executing comprising:
         (1) applying the inverse function to the value specified in the query, wherein execution of the query comprises accessing an index for a database column using an output of the inverse function when applied to the value specified in the query, or
         (2) applying the inverse function to the value specified in the query, wherein execution of the query does not apply the function to values of a database column for comparison to the value specified in the query.

2. The computing system of claim 1, the operations further comprising:
   storing a mapping between the function and the inverse function;
   wherein determining that the inverse function is available for the function comprises determining from the mapping that the inverse function is available for the function.

3. The computing system of claim 2, wherein determining that the inverse function is available for the function comprises determining that the inverse function is associated with an identifier of the function.

4. The computing system of claim 2, wherein the mapping is stored in a mapping table, the mapping table having a first attribute configured to store function identifiers and a second attribute configured to store identifiers for inverse functions that correspond to given functions.

5. The computing system of claim 1, wherein determining that the inverse function is available for the function comprises using a naming convention defined for functions and inverse functions.

6. The computing system of claim 5, wherein the inverse function and the function share at least a portion of an identifier of the function, and wherein an identifier of the inverse function comprises a token indicating that the inverse function serves as an inverse function.

7. The computing system of claim 1, wherein preparing a query execution plan that comprises the inverse function in place of the function comprises selecting the inverse function in place of the function based on a rule of a query optimizer.

8. The computing system of claim 1, wherein preparing a query execution plan that comprises the inverse function in place of the function comprises:
   determining at least part of a first query plan cost for a first putative query plan that uses the function;
   determining at least part of a second query plan cost for a second putative query plan that uses the inverse function; and
   selecting the at least part of the second putative query plan based on determining that the at least part of the second query plan cost is less than the at least part of the first query plan cost.

9. The computing system of claim 1, wherein the query comprises calls for a plurality of functions, the plurality of functions comprising the function, the operations further comprising:
   determining for multiple functions of the plurality of functions whether a respective inverse function is available for a given function of the plurality of functions.

10. The computing system of claim 9, wherein a rule used by a query optimizer specifies that an inverse function is always used for a function when an inverse function is defined for a given function.

11. The computing system of claim 9, wherein it is determined for each function of the multiple functions whether a respective inverse function should be used for a given function based on comparing a query execution cost using the given function with a query execution cost using the respective inverse function in place of the given function.

12. The computing system of claim 1, wherein the function and inverse function convert data between data formats.

13. The computing system of claim 1, wherein the query comprises a value used in a selection condition of the query and the function converts the value between data formats.

14. The computing system of claim 13, wherein a first data format of the data formats is a format used by an object of a virtual data model and a second format of the data formats is used by a database object.

15. The computing system of claim 14, wherein the inverse function converts the value in the selection condition to a data format used by the database object and the function converts a value of the database object to the format of the object of the virtual data model.

16. The computing system of claim 1, wherein executing the query execution plan that comprises the inverse function in place of the function generates first results, the operations further comprising:
   executing a second query execution plan that comprises the function in place of the inverse function to generate second results; and
   comparing the first results and the second results to determine whether the inverse function produces results equivalent to those produced using the function.

17. The computing system of claim 16, wherein the executing the second query execution plan and the comparing are performed in response to a command provided in the query.

18. A method, implemented in a computing system comprising at least one memory and at least one hardware processor coupled to the at least one memory, the method comprising:
   receiving a function definition of a function;
   receiving from a client an inverse function definition of an inverse function, wherein the inverse function is an inverse function of the function;

receiving a query, the query comprising a call for the function;

determining that the inverse function is available for the function;

preparing a query execution plan that comprises the inverse function in place of the function, wherein preparing the query execution plan comprises a rewritten predicate in which the inverse function is applied to a value specified in the query; and executing the query execution plan, the executing comprising:

(1) applying the inverse function to the value specified in the query, wherein execution of the query comprises accessing an index for a database column using an output of the inverse function when applied to the value specified in the query, or (2) applying the inverse function to the value specified in the query, wherein execution of the query does not apply the function to values of a database column for comparison to the value specified in the query.

19. The method of claim 18, wherein determining that the inverse function is available for the function comprises:

determining that the inverse function is available for the function using a naming convention defined for functions and inverse functions; or determining that the inverse function is available for the function using a mapping of the inverse function to the function.

20. One or more non-transitory computer-readable storage media comprising:

computer-executable instructions that, when executed by a computing system comprising at least one hardware processor and at least one memory coupled to the at least one hardware processor, cause the computing system to receive a function definition of a function;

computer-executable instructions that, when executed by the computing system, cause the computing system to receive from a client an inverse function definition of an inverse function, wherein the inverse function is an inverse function of the function;

computer-executable instructions that, when executed by the computing system, cause the computing system to receive a query, the query comprising a call for the function;

computer-executable instructions that, when executed by the computing system, cause the computing system to determine that the inverse function is available for the function;

computer-executable instructions that, when executed by the computing system, cause the computing system to prepare a query execution plan that comprises the inverse function in place of the function, wherein preparing the query execution plan comprises a rewritten predicate in which the inverse function is applied to a value specified in the query; and computer-executable instructions that, when executed by the computing system, cause the computing system to execute the query execution plan, the executing comprising:

(1) applying the inverse function to the value specified in the query, wherein execution of the query comprises accessing an index for a database column using an output of the inverse function when applied to the value specified in the query, or (2) applying the inverse function to the value specified in the query, wherein execution of the query does not apply the function to values of a database column for comparison to the value specified in the query.

\* \* \* \* \*